(12) United States Patent
Campagnoni

(10) Patent No.: US 8,984,122 B2
(45) Date of Patent: Mar. 17, 2015

(54) MONITORING TOOL AUDITING MODULE AND METHOD OF OPERATION

(75) Inventor: Roger A. Campagnoni, Camarillo, CA (US)

(73) Assignee: Bank of America, Charlotte, NC (US)

( * ) Notice: Subject to any disclaimer, the term of this patent is extended or adjusted under 35 U.S.C. 154(b) by 90 days.

(21) Appl. No.: 13/204,104

(22) Filed: Aug. 5, 2011

(65) Prior Publication Data

US 2013/0036219 A1 Feb. 7, 2013

(51) Int. Cl.
| | |
|---|---|
| G06F 15/173 | (2006.01) |
| G06Q 50/00 | (2012.01) |
| H04L 29/06 | (2006.01) |
| H04L 29/08 | (2006.01) |
| G06Q 10/00 | (2012.01) |

(52) U.S. Cl.
CPC ............... *G06Q 50/01* (2013.01); *H04L 29/06* (2013.01); *H04L 29/08072* (2013.01); *G06Q 10/00* (2013.01)
USPC ............................ 709/224; 709/225; 709/226

(58) Field of Classification Search
CPC .......................... H04L 29/08072; H04L 29/06
USPC ................................ 709/224–226; 726/22–25
See application file for complete search history.

(56) References Cited

U.S. PATENT DOCUMENTS

| | | | |
|---|---|---|---|
| 2003/0046271 A1 | 3/2003 | Eastham | 707/1 |
| 2005/0114829 A1 | 5/2005 | Robin et al. | 717/101 |
| 2006/0059253 A1 | 3/2006 | Goodman et al. | 709/223 |
| 2008/0082374 A1 | 4/2008 | Kennis et al. | 705/7 |
| 2010/0121906 A1* | 5/2010 | Ku et al. | 709/202 |
| 2011/0010581 A1* | 1/2011 | Tanttu et al. | 714/11 |
| 2012/0054756 A1* | 3/2012 | Arnold et al. | 718/102 |
| 2012/0084058 A1* | 4/2012 | Sowerby et al. | 702/186 |
| 2012/0137138 A1* | 5/2012 | Gregorovic et al. | 713/189 |
| 2012/0166636 A1* | 6/2012 | Page et al. | 709/224 |

(Continued)

OTHER PUBLICATIONS

*PCT Notification of Transmittal of the International Search Report and the Written Opinion of the International Searching Authority* for International Application No. PCT/US 12/46992; 14 pages, Oct. 5, 2012.

(Continued)

*Primary Examiner* — Chris Parry
*Assistant Examiner* — Weiwei Stiltner
(74) *Attorney, Agent, or Firm* — Michael A. Springs

(57) ABSTRACT

A monitoring tool auditing module comprises an interface, a memory, and a processor. The interface receives a plurality of monitoring audit requests, each monitoring audit request identifying one or more monitoring targets to be audited. The memory is coupled to the interface and stores the plurality of monitoring audit requests in a queue based at least in part upon the order that the monitoring audit requests are received by the interface. The processor is coupled to the memory and accesses a particular one of the plurality of monitoring audit requests stored in memory and determines a monitoring target to be audited based at least in part upon the particular monitoring audit request. The processor determines a plurality of monitoring tools that are deployed at the determined monitoring target, and determines status information for each determined monitoring tool deployed at the determined monitoring target. The processor further determines configuration information for each determined monitoring tool deployed at the determined monitoring target.

18 Claims, 4 Drawing Sheets

(56) References Cited

U.S. PATENT DOCUMENTS

2012/0167013 A1* 6/2012 Kaiser et al. .................. 715/846
2012/0210427 A1* 8/2012 Bronner et al. ................. 726/23

OTHER PUBLICATIONS

*Quest Software: Application Management to Unify IT and the Business*; 10 pages, 2009.

* cited by examiner

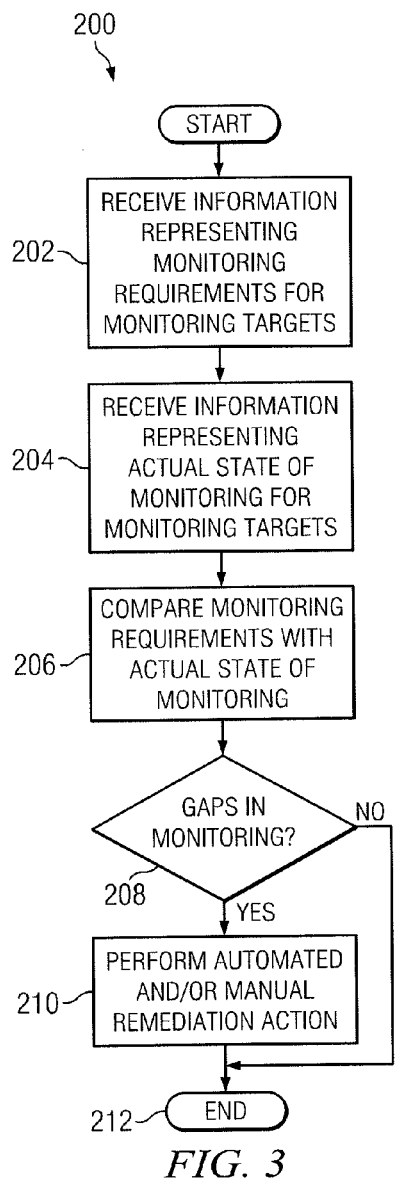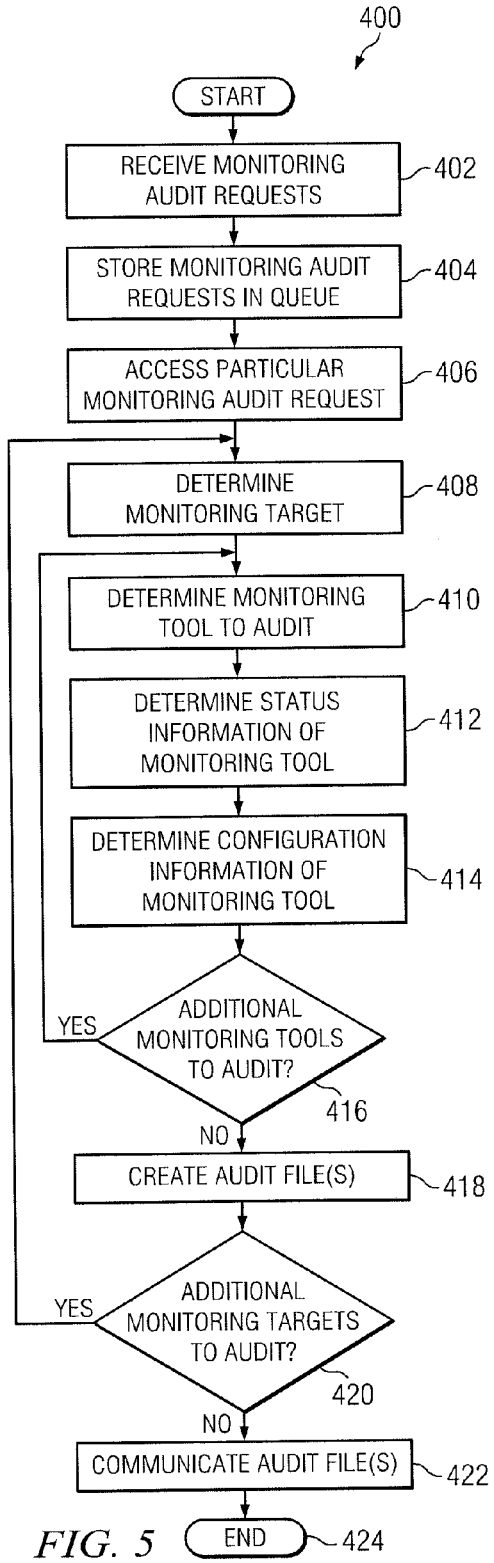
FIG. 3
FIG. 5

MONITORING TOOL AUDITING MODULE AND METHOD OF OPERATION

TECHNICAL FIELD OF THE INVENTION

The present disclosure relates to monitoring objects across an enterprise network and more specifically to a monitoring tool auditing module and method of operation.

BACKGROUND OF THE INVENTION

A business enterprise may include many computers, servers, databases, mission-critical applications, and other components deployed at various nodes in a network. Some nodes may include components that are deployed in a cloud environment. Other nodes may include components that are deployed in a stand-alone configuration on the network. The operation of these components are important to the success of the business enterprise. Monitoring tools may be used by a business enterprise to monitor the health, welfare, performance, utilization, and/or other parameters of these components. As enterprises become more complex in their deployment and operation, the need grows for advanced monitoring systems and tools.

SUMMARY OF THE INVENTION

According to one embodiment, a monitoring tool auditing module comprises an interface, a memory, and a processor. The interface receives a plurality of monitoring audit requests, each monitoring audit request identifying one or more monitoring targets to be audited. The memory is coupled to the interface and stores the plurality of monitoring audit requests in a queue based at least in part upon the order that the monitoring audit requests are received by the interface. The processor is coupled to the memory and accesses a particular one of the plurality of monitoring audit requests stored in memory and determines a monitoring target to be audited based at least in part upon the particular monitoring audit request. The processor determines a plurality of monitoring tools that are deployed at the determined monitoring target, and determines status information for each determined monitoring tool deployed at the determined monitoring target. The processor further determines configuration information for each determined monitoring tool deployed at the determined monitoring target.

The system described in this disclosure provides several advantages to enterprises. Users of the system have the ability to identify monitoring targets within the enterprise and configure monitoring requirements for each monitoring target in a standardized, data driven environment. With the aid of an interactive user interface, the user can create, update, or delete monitoring requirements documents. A monitoring tool deployment module facilitates the deployment, configuration, and/or removal of monitoring tools for monitoring targets based on monitoring deployment requests. These monitoring deployment requests may be based on monitoring requirements set forth by users in monitoring requirements documents. A monitoring tool auditing module determines a plurality of monitoring tools deployed at monitoring targets in the enterprise and gathers status and configuration information for them in audit files. A monitored objects module compares monitoring requirements, such as those set forth in monitoring requirements documents, against the actual state of monitoring in the enterprise, as determined from the status and configuration information from audit files, and determines whether there is any gap in monitoring in the enterprise. Additional monitoring tools may be deployed, existing monitoring tools may be modified, and/or existing monitoring tools may be removed, based on any determined gap in monitoring. Thus, the system of the present disclosure aggregates and audits the actual versus the desired monitoring configuration within an enterprise. In this way, the system is able to monitor and manage the rapidly changing landscape of network and server components deployed and operating in the enterprise. The system therefore supports advanced monitoring capabilities and reduces the reliance on manual processes.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which:

FIG. 3 illustrates a method for monitoring targets according to one embodiment;

FIG. 5 illustrates a method for auditing deployed monitoring tools according to one embodiment.

DETAILED DESCRIPTION OF THE INVENTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

An enterprise may include any individual, business, or organization. One example of an enterprise may include a financial enterprise. A financial enterprise may include any individual, business, or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio. The present disclosure is directed to a monitoring system 10 that may be used by an enterprise, as described in detail below.

Figure 1:
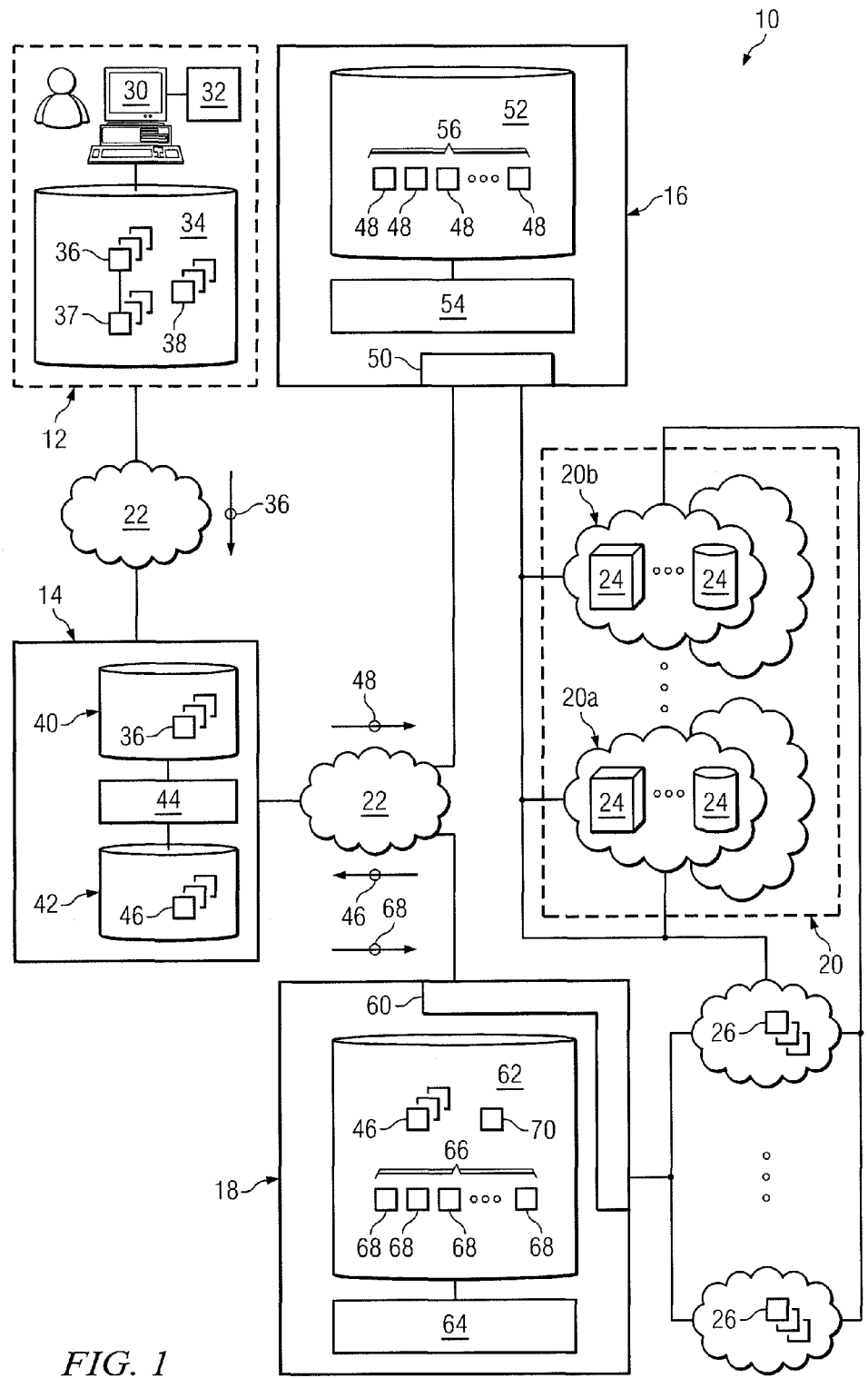
FIG. 1 illustrates a enterprise monitoring system according to one embodiment.

FIG. 1 illustrates one embodiment of an enterprise monitoring system 10 that comprises monitoring implementation module 12, a monitored object module 14, a monitoring tool deployment module 16, and an monitoring tool auditing module 18, that are interconnected to each other and to the components of a server environment 20 using a network 22. Server environment 20 includes components that are deployed in a cloud network environment 20a as well as components that are deployed in a stand-alone network environment 20b, among others. Each of these components, also referred to as monitoring targets 24, may comprise any specific physical or virtual resource or application that is deployed in the enterprise. A particular monitoring target 24 may be specified using, for example, a name, a type, and a version number. Examples of monitoring targets 24 include without limitation, file systems, CPUs, web service methods, databases, servers, load balancers, operating systems, or any other network or server objects that can be monitored in enterprise monitoring system 10 using monitoring tools 26. Monitoring tools 26 comprise software applications that collect and process information about at least one monitoring target 24, such as information regarding the health, welfare, performance, utilization, and/or other parameters associated with the target 24. In general, the components of system 10 implement the installation, configuration, maintenance, and/or auditing of monitoring tools 26 for monitoring various monitoring targets 24 within server environment 20 of a business enterprise. In particular, system 10 can perform four general processes that will each be described in greater detail below.

Figure 2:
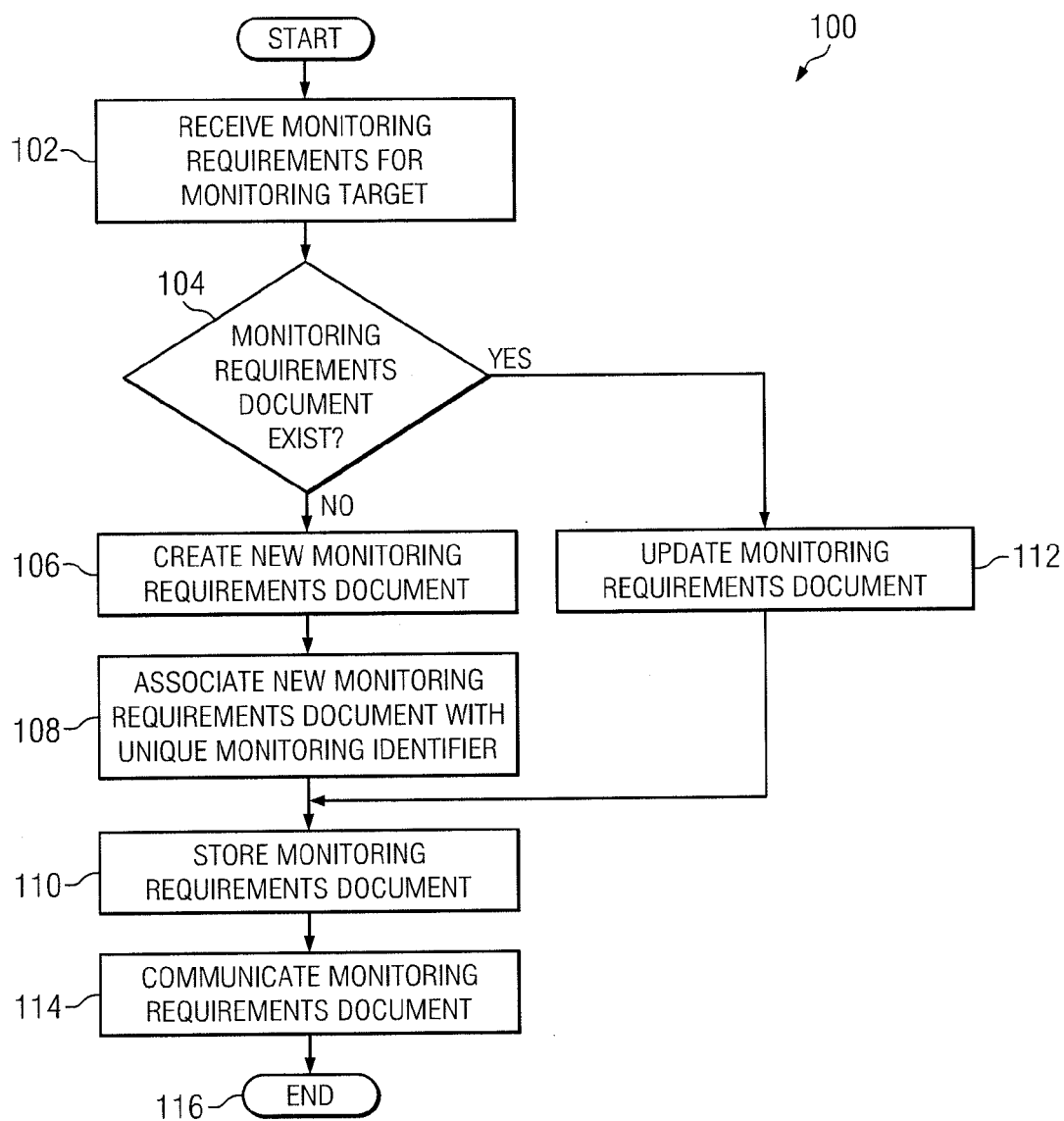
FIG. 2 illustrates a method for managing monitoring requirements documents according to one embodiment.

First, components of system 10, including monitoring implementation module 12, provide users of system 10 the ability to identify monitoring targets 24 within a business enterprise and configure the monitoring requirements for each monitoring target 24. FIG. 2 illustrates one embodiment of a flowchart regarding particular aspects of operation of monitoring implementation module 12.

Figure 4:
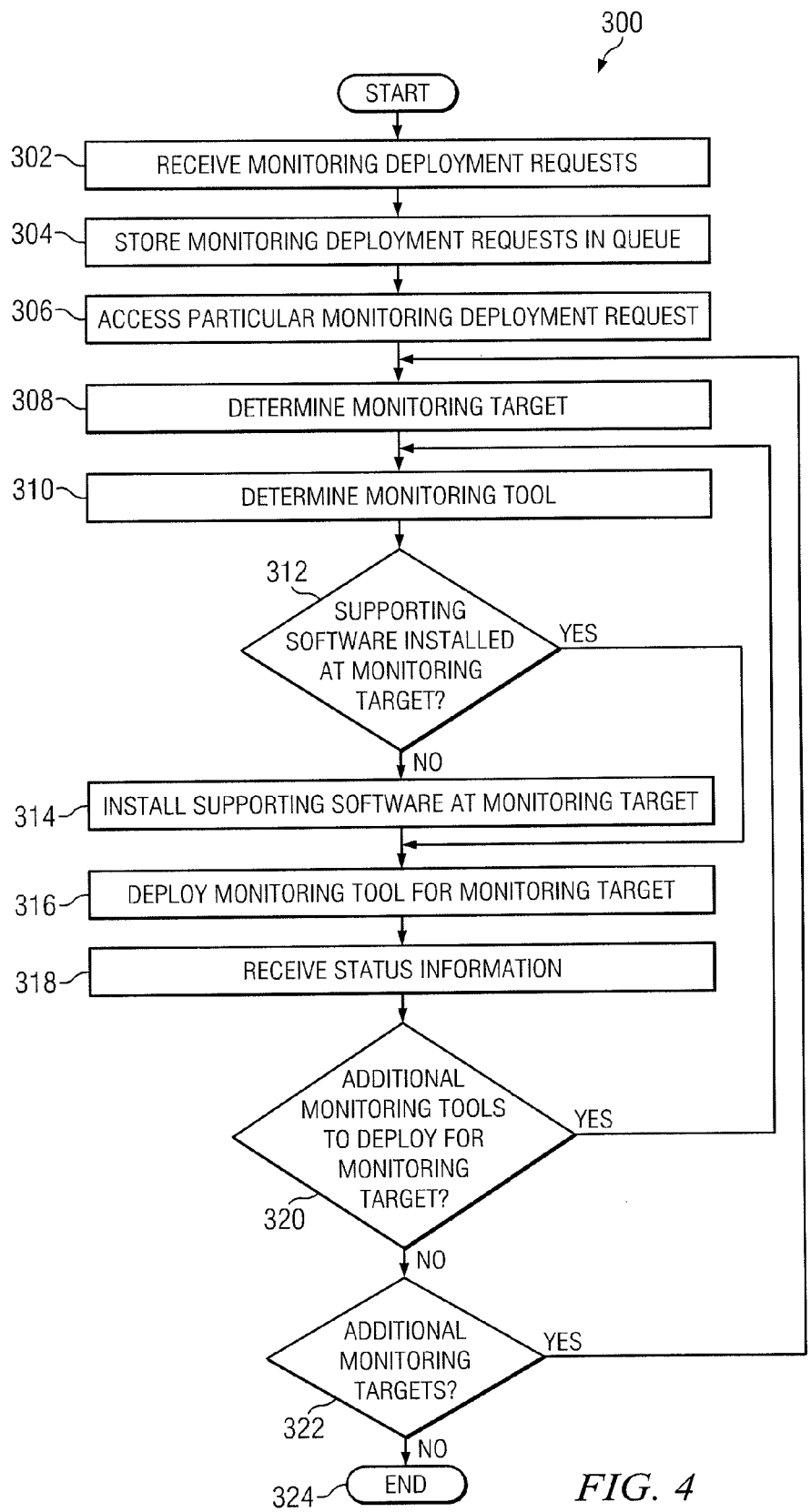
FIG. 4 illustrates a method for deploying a monitoring tool according to one embodiment.

Components of system 10, including monitoring tool deployment module 16, receive requests to deploy monitoring tools 26 for monitoring targets 24, such as requests associated with the monitoring requirements specified by users in conjunction with monitoring implementation module 12. FIG. 4 illustrates one embodiment of a flowchart regarding particular aspects of operation of monitoring tool deployment module 16. Still other components of system 10, including monitoring tool audit module 18, will gather information from monitoring tools 26 running in the enterprise. This information represents the actual state of monitoring the monitoring targets 24 in the enterprise. FIG. 5 illustrates one embodiment of a flowchart regarding particular aspects of operation of monitoring tool audit module 18.

The monitored object module 14 can compare the monitoring requirements for the plurality of monitoring targets 24 in the enterprise (e.g., as created by users of monitoring implementation module 12) with the actual state of monitoring the monitoring targets 24 in the enterprise (e.g., as reported by monitoring tool audit module 18), and request the deployment and/or modification of any monitoring tools 26 for monitoring targets 24 (e.g., using monitoring tool deployment module 16) based on a determination of any gaps in monitoring. FIG. 2 illustrates one embodiment of a flowchart regarding particular aspects of operation of monitored object module 14.

Users may access enterprise monitoring system 10 through monitoring implementation module 12. Users may include any individuals, group of individuals, entity, machine, and/or mechanism that interacts with system 10. Examples of users include, but are not limited to, a manager, executive, review board, accountant, engineer, technician, contractor, agent, and/or employee. Users may be associated with an organization or enterprise. An organization may include any social arrangement that pursues collective goals. One example of an organization is a business. A business is an organization designed to provide goods or services, or both, to consumers, governmental entities, and/or other businesses. Examples of a business may include, but are not limited to, financial enterprises, agriculture and mining businesses, manufacturers, real estate companies, retailers and distributors, service businesses, transportation companies, and utility companies. A business may include both for-profit and not-for-profit organizations. An organization may also include multiple businesses. Examples of organizations are not limited to businesses. For example, an organization can itself be a government entity. In one example embodiment, enterprise monitoring system 10 is associated with a financial enterprise, and a user is an employee or representative of the financial enterprise.

Monitoring implementation module 12 comprises a graphical user interface (GUI) 30, a processor 32, and a memory 34. GUI 30 is generally operable to receive, tailor, and filter data entered by and presented to the user. In one embodiment, GUI 30 receives information input by a user that identifies one or more monitoring targets 24 in the enterprise and monitoring requirements for the monitoring targets 24. In this regard, GUI 30 comprises a web-enabled interface which collects monitoring requirements from participants of an enterprise and stores them in a standardized, data-driven manner. GUI 30 may provide the user with an efficient and user-friendly presentation of information. The term GUI 30 may be used in the singular or in the plural to describe one or more GUIs 30 in each of the displays of a particular GUI 30.

Processor 32 communicatively couples to GUI 30, memory 34, other components of monitoring implementation module 12, and other components of system 10, and controls the operation and administration of monitoring implementation module 12. Processor 32 includes any hardware and/or software that operates to control and process information. Processor 32 may be a programmable logic device, a microcontroller, a microprocessor, any suitable processing device, or any suitable combination of the preceding.

Memory 34 stores, either permanently or temporarily, data, operational software, or other information for processor 32. Memory 34 includes any one or a combination of volatile, non-volatile local or remote devices suitable for storing information. For example, memory 34 may include random access memory (RAM), read only memory (ROM), magnetic storage devices, optical storage devices, or any other suitable information storage devices or a combination of the preceding. While illustrated as including particular modules, memory 34 may include any suitable information for use in the operation of monitoring implementation module 12, or any other component of system 10.

Memory 34 stores a plurality of monitoring requirements documents 36 that are, in one embodiment, created by users. A monitoring requirements document 36 comprises a document, a file, or any suitable data structure that specifies monitoring requirements for a monitoring target 24. The monitoring requirements may identify one or more monitoring tools 26 to be deployed at a monitoring target 24, and configuration parameters for each such monitoring tool 26. In one embodiment, a user may specify the monitoring requirements using GUI 30. The user submission for monitoring requirements may go through one or more levels of approvals. For example, a subject matter expert for monitoring requirements within the enterprise may provide oversight and approval of monitoring requirements documents 36. A monitoring requirements document 36 may add, modify, or delete monitoring requirements for monitoring targets 24 in an enterprise. Each monitoring requirements document 36 may be associated with a unique monitoring ID 37. Unique monitoring IDs 37 can be used to aggregate sets of services and/or servers to particular applications, and even supported lines of business within the enterprise. Memory 34 may further store configuration information 38 for monitoring targets 24. Configuration information 38 includes information regarding any components that may be added to or removed from server environment 20, and any modifications to such components. Monitoring requirements documents 36 may be created and/ or updated to account for such configuration information 38. Monitoring implementation module 12 may communicate monitoring requirements documents 36 to monitored object module 14.

Monitored object module 14 comprises a first database 40, a second database 42, and a processor 44. First database 40 stores information representing monitoring requirements for monitoring targets 24 in the enterprise. For example, first database 40 stores monitoring requirements documents 36 received from monitoring implementation module 12. Second database 42 stores information representing the actual state of monitoring for the monitoring targets 24 in the enterprise. For example, second database 42 stores audit files 46 that comprise status and configuration information for the plurality of monitoring tools 26 that are deployed at various monitoring targets 24 in the enterprise. Audit files 46 may be received from monitoring tool auditing module 18, as described in greater detail below. First database 40 and second database 42 may be stored in the same or different memory devices. These memory devices can be configured like memory 30 described above.

Processor 44 communicatively couples to first database 40, second database 42, other components of monitored object module 14, and other components of system 10, and controls the operation and administration of monitored object module 14. Processor 44 includes any hardware and/or software that operates to control and process information. Processor 44 may be a programmable logic device, a microcontroller, a microprocessor, any suitable processing device, or any suitable combination of the preceding. In general, processor 44 compares the actual state of monitoring being performed on monitoring targets 24 in the enterprise, as represented by information stored in second database 42, against the monitoring requirements established, for example, by monitoring requirements documents 36 stored in first database 40, and determines any gaps in monitoring for the monitoring targets 24 based at least in part on this comparison. Any gaps in monitoring may be represented in a gap report indicating, for example, any of the following conditions with respect to monitoring tools 26: (1) requested, not deployed, and not audited; (2) requested, deployed and not audited; (3) requested, deployed and audited; and (4) audited and not requested. Based on any determined gaps in monitoring within the enterprise, processor 44 can generate one or more monitoring deployment requests 48 for communication to monitoring tool deployment module 16. The monitoring deployment requests 48 may identify one or more monitoring tools 26 to be deployed for the monitoring targets 24 in the enterprise. In this regard, monitored object module 14 analyzes actual versus desired monitoring configurations. In one embodiment, the monitoring deployment requests 48 may also be based directly on monitoring requirements contained in any monitoring requirements documents 36.

Monitoring tool deployment module 16 comprises an interface 50, a memory 52, and a processor 54. Interface 50 represents any suitable device operable to receive information from network 22, transmit information through network 22, perform processing of information, communicate to other devices in system 10, or any combination of the preceding. For example, interface 50 receives monitoring deployment requests 48, each request 48 identifying one or more monitoring tools 26 to be deployed for one or more monitoring targets 24. Interface 50 represents any port or connection, real or virtual, including any suitable hardware and/or software, including protocol conversion and data processing capabilities, to communicate through a LAN, WAN, or other communication system that allows monitoring tool deployment module 16 to exchange information with other components of system 10 through network 22.

Memory 52 couples to the interface 50 and stores a plurality of monitoring deployment requests 48 in a queue 56. In one embodiment, the requests 48 are arranged based at least in part upon the order that the monitoring deployment requests 48 are received by the interface 50. In a particular embodiment, the requests 48 are stored in queue 56 according to the date and time that they are received by interface 50. Memory 52 can be configured like memory 30 described above.

Processor 54 communicatively couples to interface 50 and memory 52 and other components of system 10, and controls the operation and administration of monitoring tool deployment module 16. Processor 54 includes any hardware and/or software that operates to control and process information. Processor 54 may be a programmable logic device, a microcontroller, a microprocessor, any suitable processing device, or any suitable combination of the preceding. In general, processor 54 facilitates the deployment, configuration, and/or removal of monitoring tools 26 for monitoring targets 24 based at least in part upon monitoring deployment requests 48 stored in queue 56 of memory 52. In one embodiment, processor 54 processes monitoring deployment requests 48 in a first in/first out fashion according to the order that they are received by interface 50. In other embodiments, processor 54 processes monitoring deployment requests 48 based on a priority assigned to the requests 48. In still other embodiments, processor 54 processes monitoring deployment requests 48 based on any suitable combination of the order that requests 48 are received by interface 50 and the priority that is assigned to requests 48. In addition to deployment of monitoring tools 26, processor 54 also facilitates the installation, configuration, and/or enabling of specific capabilities of monitoring tools 26.

System 10 may support the use of any number and combination of monitoring tools 26 to monitor the health, welfare, performance and/or utilization of monitoring targets 24, and detect any deviations associated therewith. Monitoring tools 26 can be either agent-based or agent-less. Non-limiting examples of particular monitoring tools 26 that may be used in system 10 include: ITM, Foglight, ITCAM, and Introscope. A monitoring tool 26 can be configured based on the monitoring tool name, technology vendor, version, status (active or inactive), parameters (interval, monitoring time, monitoring situation, persistence, thresholds, monitoring window, severity, etc.), and/or event information. Existing monitoring tools 26 can be modified and/or new monitoring tools 26 may be created. In one embodiment, monitoring tool deployment module 16 may use any suitable Application Programming Interface (API) or Command Line Interface (CLI) associated with interface 50 to communicate instructions and information to monitoring tools 26 to facilitate their deployment with respect to particular monitoring targets 24. After a monitoring tool 26 is attempted to be deployed, processor 54 of monitoring tool deployment 16 may receive a message indicating the status of installation of the monitoring tool 26. The status may indicate the success, partial success, failure, or partial failure of any attempt to deploy a monitoring tool 26, together with associated details. Processor 54 may deploy any number and combination of monitoring tools 26 for one or more monitoring targets 24. In a particular embodiment, processor 54 may initiate the deployment of multiple monitoring tools 26 in parallel with each other.

In some embodiments, monitoring tools 26 require agents to be installed at monitoring targets 24 before monitoring can be accomplished. In these circumstances, processor 54 of module 16 may be able to determine whether an appropriate agent is installed at a monitoring target 24 for a given monitoring tool 26, such as a monitoring tool 26 that module 16 seeks to deploy. If an agent is not appropriately installed, then processor 54 may facilitate the installment of such an agent at an appropriate monitoring target 24 in conjunction with the deployment of a monitoring tool 26.

Monitoring tool auditing module 18 comprises an interface 60, a memory 62, and a processor 64. Interface 60 represents any suitable device operable to receive information from network 22, transmit information through network 22, perform processing of information, communicate to other devices in system 10, such as monitoring tools 26, or any combination of the preceding. For example, interface 60 receives monitoring audit requests 68, such as from monitored object module 14, each request 68 identifying one or more monitoring tools 26 to be audited for one or more monitoring targets 24. Interface 60 represents any port or connection, real or virtual, including any suitable hardware and/or software, including protocol conversion and data processing capabilities, to communicate through a LAN, WAN, or other communication system that allows monitoring tool auditing module 18 to exchange information with other components of system 10 through network 22.

Memory 62 couples to the interface 60 and stores a plurality of monitoring audit requests 68 in a queue 66. In one embodiment, the requests 68 are arranged based at least in part upon the order that they are received by the interface 60. In a particular embodiment, the requests 68 are stored in queue 66 according to the date and time that they are received by interface 60. In one embodiment, memory 62 stores an auditing schedule 70 that provides a timetable for auditing monitoring targets 24 (e.g., date, time, frequency, order, etc.). Memory 62 can be configured like memory 30 described above.

Processor 64 communicatively couples to interface 60, memory 62, and other components of system 10, and controls the operation and administration of monitoring tool auditing module 18. Processor 64 includes any hardware and/or software that operates to control and process information. Processor 64 may be a programmable logic device, a microcontroller, a microprocessor, any suitable processing device, or any suitable combination of the preceding. In general, processor 64 determines a plurality of monitoring targets 24 to be audited based on the monitoring audit requests 68 and/or schedule 70, determines a plurality of monitoring tools 26 that are deployed at the determined monitoring targets 24, and determines status and configuration information for each determined monitoring tool 26 deployed at the determined monitoring target 24. Processor 64 may create and memory 62 may store audit files 46. Audit files 46 list all of the currently deployed monitoring tools 26 in the enterprise and provide status and configuration information for the plurality of monitoring tools 26 and monitoring targets 24 that are audited by monitoring tool auditing module 18. Monitoring tool auditing module 18 communicates audit files 46 to monitored objects module 14.

FIG. 2 illustrates one embodiment of a method for managing monitoring requirements documents 36. The method is illustrated in flow chart 100. After the method starts, execution proceeds to step 102 where processor 32 of monitoring implementation module 12 receives monitoring requirements for a monitoring target 24. The monitoring requirements may be inputted by a user using GUI 30, and may be inputted by the user along with other information. Execution proceeds to step 104 where processor 32 determines whether a monitoring requirements document 36 exists for the monitoring target 24 specified at step 102. If no monitoring requirements document 36 exists, as determined at step 104, execution proceeds to step 106 where processor 32 creates a new monitoring requirements document 36 for the monitoring target 24 based on the monitoring requirements set forth at step 102. At step 108, processor 36 associates the new monitoring requirements documents 32 with a unique monitoring identifier 37. If processor 32 determined that a monitoring requirements document 36 did exist at step 104, execution proceeds to step 112 where processor 32 updates the existing monitoring requirements document 36 in accordance with the monitoring requirements set forth at step 102. Upon execution of either step 108 or step 112, execution proceeds to step 110 where memory 34 stores monitoring requirements document 36. The monitoring requirements document 36 specifies the monitoring requirements for the monitoring target 24 and is associated with the unique monitoring identifier 37. The monitoring requirements document 36 may have been created at step 108 or updated at step 112. At step 114, processor 32 communicates monitoring requirements document 36 to monitored objects module 14. Execution terminates at step 116.

FIG. 3 illustrates one embodiment of a method for monitoring targets 24. The method is illustrated in flow chart 200. After the method starts, execution proceeds to step 202 where processor 44 receives information representing monitoring requirements for monitoring targets 24. The monitoring requirements received at step 202 may be a part of monitoring requirements documents 36 that are stored in first database 40 of monitored objects module 14. Execution proceeds to step 204 where processor 44 receives information representing the actual state of monitoring for monitoring targets 24. The information representing the actual state of monitoring for the monitoring targets 24 may be a part of audit files 46 stored in second database 42. Execution proceeds to step 206 where processor 44 compares the monitoring requirements received at step 202 with the actual state of monitoring received at step 204. Processor 44 determines whether there are any gaps in monitoring at step 208 based on the comparison performed at step 206. If processor 44 determines at step 208 that there are gaps in monitoring, execution proceeds to step 210, where processor 44 generates one or more monitoring deployment requests 48. The monitoring deployment requests 48 identify one or more monitoring tools 26 to be deployed for the monitoring targets 24 in the enterprise based at least in part on any determined gaps in monitoring. If there are no gaps in monitoring as determined at step 208, or after the execution of step 210, execution terminates at step 212.

FIG. 4 illustrates one embodiment of a method for deploying a monitoring tool 26. The method is illustrated in flow chart 300. After the method starts, execution proceeds to step 302 where processor 54 of monitoring tool deployment module 16 receives monitoring deployment requests 48. Execution proceeds to step 304 where memory 52 of monitoring tool deployment module 16 stores the monitoring deployment requests 48 in queue 56. Execution proceeds to step 306 where processor 54 accesses a particular monitoring deployment request 48 from queue 56. In one embodiment, processor 54 accesses monitoring deployment requests 48 from queue 56 in a first in/first out fashion. In other embodiments, processor 54 accesses monitoring deployment requests 48 according to an indication of priority. In still other embodiments, processor 54 accesses monitoring deployment requests 48 based on a combination of the order that request 48 was received by module 16 and the priority of the request 48.

Execution proceeds to step 308 where processor 54 determines a monitoring target 24 based at least in part on the particular monitoring deployment request 48 accessed at step 306. Execution proceeds to step 310 where processor 54 determines a monitoring tool 26 to be used based at least in part on the particular monitoring deployment request 48 accessed at step 306. At step 312, processor 54 determines whether an agent is installed at the monitoring target 24 determined at step 308. If not, execution proceeds to step 314 where processor 54 facilitates the installation of an appropriate agent at monitoring target 24. If it is determined at step 312 that an agent is installed at monitoring target 24, or after the execution of step 314, execution proceeds to step 316, where processor 54 facilitates the deployment of monitoring tool 26 for monitoring target 24. Execution proceeds to step 318 where processor 54 receives status information regarding the deployment of monitoring tool 26. The status information may indicate that the monitoring tool 26 was deployed successfully, or that it was a complete failure, or that it was either a partial failure or partial success.

Execution proceeds to step 320 where processor 54 determines whether additional monitoring tools 26 should be deployed for the monitoring target 24 determined at step 308. If so, then execution returns to step 310. If not, then execution proceeds to step 322 where processor 54 determines whether there are additional monitoring targets 24 with respect to the particular monitoring deployment request 48 accessed at step 306. If so, then execution returns to step 308. If not, then execution terminates at step 324.

FIG. 5 illustrates one embodiment of a method for auditing deployed monitoring tools 26. The method is illustrated in flow chart 400. After the method starts, execution proceeds to step 402 where processor 64 of monitoring tool auditing module 18 receives monitoring audit requests 68. At step 404, memory 64 of module 18 stores the monitoring audit requests 68 in queue 66. Execution proceeds to step 406, where processor 64 accesses a particular monitoring audit request 68 from queue 66. At step 408, processor 64 determines a monitoring target 24 to be audited based at least in part upon the particular monitoring audit request 68 accessed at step 406. Execution proceeds to step 410, where processor 64 determines a monitoring tool 26 to audit and that is deployed at determined monitoring target 24. Execution proceeds to step 412, where processor 64 determines status information of monitoring tool 26. At step 414, processor 64 determines configuration information of monitoring tool 26. At step 416, processor 64 determines whether additional monitoring tools should be audited based on the monitoring target 24 determined at step 408. If so, execution returns to step 410. If not, execution proceeds to step 418, where processor 64 creates audit files 46 that include the status information and the configuration information determined at steps 412 and 414, respectively. Execution proceeds to step 420, where processor 64 determines whether there are additional monitoring targets 24 to audit, based on the particular monitoring audit request 68 accessed at step 406. If so, execution returns to step 408. If not, execution proceeds to step 422, where processor 64 communicates audit files 46 to monitored object module 14. Execution terminates at step 424.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

What is claimed is:

1. A monitoring tool auditing module, comprising:
an interface operable to receive a plurality of monitoring audit requests, each monitoring audit request identifying one or more monitoring targets to be audited;
a memory coupled to the interface and operable to store the plurality of monitoring audit requests in a queue based at least in part upon the order that the monitoring audit requests are received by the interface; and
a processor coupled to the memory and operable to:
access a particular one of the plurality of monitoring audit requests stored in memory;
determine a monitoring target to be audited based at least in part upon the particular monitoring audit request;
determine a plurality of monitoring tools that are deployed at the determined monitoring target by obtaining a list of monitoring tools that are installed at the determined monitoring target;
determine status information for each determined monitoring tool deployed at the determined monitoring target, wherein determining status information for a particular determined monitoring tool comprises:
determining whether the particular determined monitoring tool was deployed successfully at the determined monitoring target;
generating a status message, the status message indicating that the deployment of the particular determined monitoring tool was at least one of a success, a partial success, a partial failure, and a failure;
determine configuration information for each determined monitoring tool deployed at the determined monitoring target, wherein determining configuration information for the particular determined monitoring tool comprises determining a monitoring tool name, a technology vendor, a version, one or more parameters, and event information;
transform the status information and the configuration information into an audit file; and
communicate the audit file to a monitored objects module to facilitate comparing the audit file against one or more monitoring requirements documents.

2. The monitoring tool auditing module of claim 1, wherein the monitoring tool comprises an application that collects and processes information about at least one monitoring target.

3. The monitoring tool auditing module of claim 1, wherein the monitoring tool is separate from the monitoring tool auditing module.

4. The monitoring tool auditing module of claim 1, wherein the monitoring target comprises a specific physical or virtual resource or application at a node in a network.

5. The monitoring tool auditing module of claim 1, wherein the monitoring target may be specified based at least in part upon a name, a type, and a version number.

6. The monitoring tool auditing module of claim 1, wherein the determined monitoring target comprises a first monitoring target, and the processor is further operable to:
    determine a second monitoring target; and
    determine a plurality of monitoring tools that are deployed at the second monitoring target.

7. The monitoring tool auditing module of claim 6, wherein the memory is operable to store audits files that comprise status and configuration information for the plurality of monitoring tools deployed at the first monitoring target and status and configuration information for the plurality of monitoring tools deployed at the second monitoring target.

8. A monitoring tool auditing module, comprising:
    a memory operable to store a schedule for auditing a plurality of monitoring targets; and
    a processor coupled to the memory and operable to:
        determine a first monitoring target to be audited based at least in part upon the schedule;
        determine a plurality of monitoring tools that are deployed at the first monitoring target;
        determine status information for each determined monitoring tool deployed at the first monitoring target, wherein determining status information for a particular determined monitoring tool comprises:
            determining whether the particular determined monitoring tool was deployed successfully at the first monitoring target;
            generating a status message, the status message indicating that the deployment of the particular determined monitoring tool was at least one of a success, a partial success, a partial failure, and a failure;
        determine configuration information for each determined monitoring tool deployed at the first monitoring target, wherein determining configuration information for the particular determined monitoring tool comprises determining a monitoring tool name, a technology vendor, a version, one or more parameters, and event information;
        determine a second monitoring target to be audited based at least in part upon the schedule;
        determine a plurality of monitoring tools that are deployed at the second monitoring target by obtaining a list of monitoring tools that are installed at the second monitoring target;
        determine status information for each determined monitoring tool deployed at the second monitoring target;
        determine configuration information for each determined monitoring tool deployed at the second monitoring target; and
        create an audit file that comprises status and configuration information for the plurality of monitoring tools deployed at the first monitoring target and status and configuration information for the plurality of monitoring tools deployed at the second monitoring target; and
        communicate the audit file to a monitored objects module to facilitate comparing the audit file against one or more monitoring requirements documents.

9. The monitoring tool auditing module of claim 8, wherein the monitoring tool comprises an application that collects and processes information about at least one monitoring target.

10. The monitoring tool auditing module of claim 8, wherein the monitoring tool is separate from the monitoring tool auditing module.

11. The monitoring tool auditing module of claim 8, wherein the monitoring target comprises a specific physical or virtual resource or application at a node in a network.

12. The monitoring tool auditing module of claim 8, wherein the monitoring target may be specified based at least in part upon a name, a type, and a version number.

13. A method for auditing deployed monitoring tools, comprising:
    receiving a plurality of monitoring audit requests, each monitoring audit request identifying one or more monitoring targets to be audited;
    storing the plurality of monitoring audit requests in a queue based at least in part upon the order that the monitoring audit requests are received;
    accessing a particular one of the plurality of monitoring audit requests;
    determining, using a processing device, a monitoring target to be audited based at least in part upon the particular monitoring audit request;
    determining a plurality of monitoring tools that are deployed at the determined monitoring target by obtaining a list of monitoring tools that are installed at the determined monitoring target;
    determining status information for each determined monitoring tool deployed at the determined monitoring target, wherein determining status information for a particular determined monitoring tool comprises:
        determining whether the particular determined monitoring tool was deployed successfully at the determined monitoring target;
        generating a status message, the status message indicating that the deployment of the particular determined monitoring tool was at least one of a success, a partial success, a partial failure, and a failure;
    determining configuration information for each determined monitoring tool deployed at the determined monitoring target, wherein determining configuration information for the particular determined monitoring tool comprises determining a monitoring tool name, a technology vendor, a version, one or more parameters, and event information;
    transforming the status information and the configuration information into an audit file; and
    communicating the audit file to a monitored objects module to facilitate comparing the audit file against one or more monitoring requirements documents.

14. The method of claim 13, wherein the monitoring tool comprises an application that collects and processes information about at least one monitoring target.

15. The method of claim 13, wherein the monitoring target comprises a specific physical or virtual resource or application at a node in a network.

16. The method of claim 13, wherein the monitoring target may be specified based at least in part upon a name, a type, and a version number.

17. The method of claim 13, wherein the determined monitoring target comprises a first monitoring target, and further comprising:
    determining a second monitoring target; and
    determining a plurality of monitoring tools that are deployed at the second monitoring target.

18. The method of claim 17, further comprising storing audit files that comprise status and configuration information for the plurality of monitoring tools deployed at the first monitoring target and status and configuration information for the plurality of monitoring tools deployed at the second monitoring target.

\* \* \* \* \*